United States Patent
Herrin

[15] 3,687,166
[45] Aug. 29, 1972

[54] REPAIR VALVE

[72] Inventor: Paul E. Herrin, 2164 Meyer Place, Costa Mesa, Calif. 92627

[22] Filed: Aug. 25, 1970

[21] Appl. No.: 66,737

[52] U.S. Cl.....................................138/94, 137/318
[51] Int. Cl..................................................F16l 55/10
[58] Field of Search..............138/94.3, 94; 137/318; 251/217, 218

[56] References Cited

UNITED STATES PATENTS 3,532,113   10/1970   McKean....................137/318

*Primary Examiner*—Herbert F. Ross
*Attorney*—Nienow & Frater

[57] ABSTRACT

This disclosure relates to a control valve arranged for installation at a point along the length of a pipe whose fluid flow is to be controlled. The disclosed valve comprises a split housing that is hermetically sealed around a portion of the pipe and a pipe cutting arrangement carried within the housing on the flow control element then cuts away a section of the enclosed pipe. The flow control assembly is then inserted into the cutaway area, and thereafter, serves to control the flow of fluid through the control valve.

5 Claims, 4 Drawing Figures

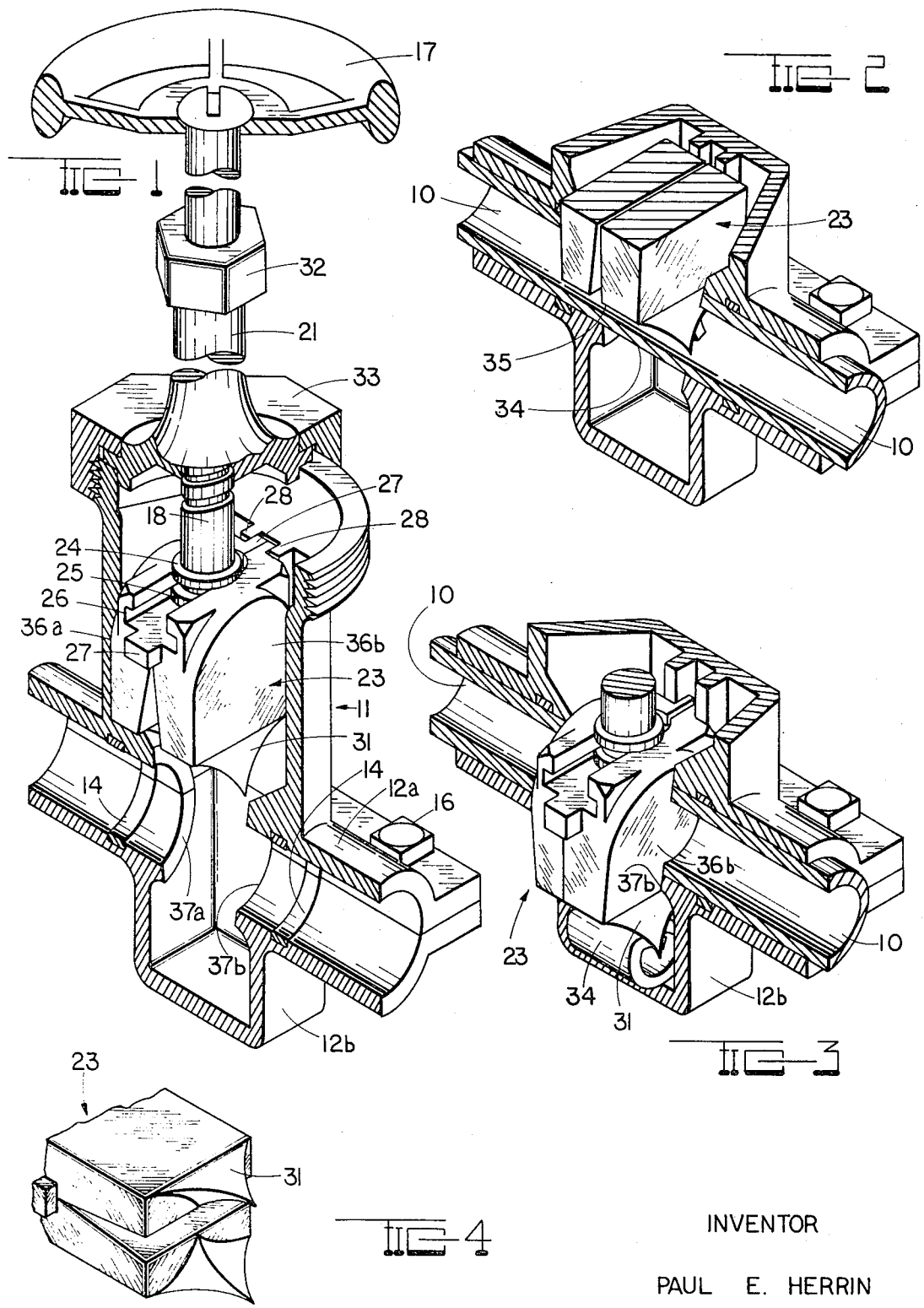

REPAIR VALVE

BACKGROUND

Especially in the construction of large area projects such as multiple buildings, housing developments, shopping centers, and the like, it frequently happens that a water pipe is inadvertently ruptured, by hand tools, by subsidance, by earth-moving machines, etc. and the result is that water gushes out of the rupture in an uncontrolled manner. This outgushing is, of course, undesirable and must be quickly stopped to minimize damage and to permit repair of the ruptured pipe.

The primary method of stopping the outgushing is to close the master valve; but this is often time-consuming particularly when lower echelon workers do not know the location of the master valve. Moreover, closing the master valve shuts off the water over a relatively large area, which is often undesirable.

Another method of stopping the outgushing is to install a local control valve that shuts off the fluid flow only through the ruptured pipe. While the local control valve may be installed at the rupture area, it is generally more advantageous to install it upstream of the rupture. However, the installation of such a local control valve requires cutting through the intact pipe, and installing the local control valve at this point. This procedure has been difficult, since cutting through the intact pipe produces another outgushing; and, in order to install the new control valve, the repairman must work in a thoroughly wetted area that has water continuously pouring out of the intentionally cut pipe.

OBJECTS AND DRAWINGS

It is therefore a principal object of the present invention to provide an improved apparatus for controlling the flow of fluid through a pipe.

It is another object of the present invention to provide an improved apparatus for installation into a pipe, as distinguished from an end of the pipe whose fluid flow is to be controlled.

It is still another object of the present invention to provide an improved control valve for installation into a pipe.

It is a further object of the present invention to provide a novel control valve, of the clamp-on type for controlling the flow of fluid through a pipe.

It is a still further object of the present invention to provide an improved method of controlling the fluid flow through a ruptured pipe.

That the attainment of these objects, and others, will be realized in the invention will be apparent from the following description, taken with the drawings, of which:

FIG. 1 shows a pictorial, cutaway view of the overall apparatus;

FIG. 2 shows a partial cutaway view of the apparatus as it appears in use;

FIG. 3 shows another partial cutaway view of the apparatus; and

FIG. 4 shows the cutters in a fragmented, pictorial view.

SYNOPSIS

Broadly stated, the disclosed control valve comprises a split housing that is affixed around a portion of the pipe whose fluid flow is to be controlled. Suitable sealing materials are included to provide a leak-proof arrangement. A cutting means, located in the housing, is then activated to shear away a section of the enclosed pipe and to produce a cutaway area. The resultant sheared ends of the pipe are formed substantially flush with sealing surfaces of the housing. A fluid flow control means, located in the housing, is then inserted into the cutaway area in abutment with the sealing surfaces thus controlling the fluid flow through the control valve.

INTRODUCTION

As was indicated above, it is frequently desirable to quick shut off the fluid flow through a pipe, particularly through a ruptured pipe, in order to permit repairs to the rupture after which the fluid flow is to be re-initiated. To do this, it was generally necessary to cut into or through an intact portion of the pipe, prepare the intentionally cut pipe to receive a local control valve, and then to install the local control valve. During all this time, the fluid would be gushing out of the intentionally cut pipe into the work area, making the installation of the control valve extremely difficult.

DESCRIPTION

The present invention simplifies the above procedure by providing a novel control valve, and defining the simplified installation thereof. Referring now to FIG. 1, there is shown a fluid carrying pipe 10 having a portion thereof exposed. The disclosed control valve 11 has a transversely split housing comprising an upper housing portion 12a and a lower housing portion 12b. The housing is clamped around a portion of pipe 10. Use of a suitable sealing material 14 such as an O-ring, solder, sealing compound, plastic film, or the like, provides a leak-proof arrangement. Suitably tight clamping is achieved by means of devices such as bolts 16. In this way, the disclosed control valve 11 is fastened to the exterior of pipe 10 at a convenient, dry location upstream of the rupture. The housing encloses a portion of the pipe in a leak-proof manner.

Once the control valve 11 has been suitably clamped in place on pipe 10, the control handle 17 of control valve 11 is rotated in a given direction, and this handle rotation turns a threaded valve stem 18 which engages internal threads (not shown) of sleeve 21. Thus, the lower internal end of valve stem 18 is lowered, or driven further into the housing.

As illustrated, the lower end of valve stem 18 is coupled to an assembly 23 which will be discussed later in greater detail. The coupling between assembly 23 and the lower end of valve stem 18 may comprise a collar 24 affixed to, or integral with, the valve stem for forcing assembly 23 downward when control handle 17 is rotated in a given direction. The coupling may also comprise a disc 25 affixed to, or integral with, the valve stem and fitted into a suitably shaped receptacle 26 of assembly 23 for raising the assembly when the control handle 17 is rotated in the opposite direction. Thus, by suitable rotation of the control handle 17, the assembly 23 may be either raised or lowered, and by using suitably shaped and dimensioned threads, the raising and lowering of the assembly may be made very forcible.

Directing attention now to assembly 23, it will be seen that this is illustrated as comprising a guiding arrangement, such as one or more raised ridges 27 that co-act with tracks 28 of housing 12 for the purpose of guiding the vertical movement of assembly 23.

CUTTING OPERATION

Assembly 23 comprises a body formed with parallel faces 36a and 36b at those of its sides that face upstream and downstream in the valve. It is provided with a V-shaped notch extending almost through it on the mid plane between faces 36a and 36b. At its lower end the body is provided with a pair of spaced cutters 31, one attached at each side of the notch, that are illustrated as being V-shaped and about one-half as long as the diameter of the pipe 10. In FIG. 1, assembly 23 is shown to have been lowered just far enough for the tips of cutters 31 to contact the top of the pipe when assembled with the pipe.

While the pipe 10 has been omitted from FIG. 1 for clarity, it will be realized that up to this time fluid has been flowing through the pipe, which is intact within housing 12. As the control handle 17 is rotated in a given direction to lower assembly 23, this forcible lowering action causes the tips of cutters 31 to puncture the upper portion of the pipe wall and at this time the fluid in the pipe will escape through the now punctured pipe wall into the interior of housing 12. However, the "escaped" fluid will be contained by the previously mentioned sealant material 14, and by sealing caps 32 and 33. Thus, due to the previously described hermetically sealed arrangement, no fluid escapes from the control valve, and the immediate work area remains dry.

FIG. 2 includes the pipe 10 and it shows the assembly 23 to have been lowered to the point that the tips of cutters 31 have pierced the lower pipe wall, thus producing a cutaway cylindrically shaped section 34 of the pipe, and also producing a cutaway area that will be discussed later. Because of the relatively long cutters 31, shown in the illustration, all of the power applied to the control handle 17 was used during the initial cutting in the pipe cutting operation; this makes for an efficient use of the applied power. After the pipe cutting action has begun, the blunt bottom 35 of the assembly 23 abuts the top portion of the cutaway section 34.

Referring now to FIG. 3, it will be seen that further rotation of the control handle has caused the blunt bottom of assembly 23 to drive the cutaway pipe section 34 into a retaining recess in the bottom portion 12b of the housing. If desired, spring fingers (not shown) or other means may be used to retain the pipe section 34 in the retaining recess when the assembly 23 is later withdrawn by reversed rotation of the control handle.

FLUID FLOW CONTROL

Referring back to FIGS. 1 and 3, this shows a modified "solid wedge gate valve". This type of valve is characterized by the fact that assembly 23, after the initial pipe cutting action is complete, is a wedge-shaped block of material having its gate surfaces or flow control surfaces, 36a and 36b, sloped to form the wedge. It will also be noted in FIG. 1 that the housing 12 has two sealing surfaces 37a and 37b that are suitably sized and sloped to make them capable of mating with the sloping flow control surfaces 36a and 36b of assembly 23.

Thus, in the ultimate downward position of assembly 23 as shown in FIG. 3, the tapered flow control surfaces 36a and 36b of the assembly 23 abut the tapered sealing surfaces 37a and 37b of the housing. This mating abutment of each flow control surface with its associated sealing surface shuts off the fluid flow through the control valve. Actually, only one such abutment is necessary for shutting off the fluid flow, but the wedge shape provides the desired pressure and automatically provides a second abutment.

THE CUTTERS

It will be realized from the foregoing explanation that the wedge-shaped assembly 23 fits into a wedge-shaped cutaway area; and that the cutaway area is defined by the spacing and the angles of the sealing surfaces 37. Since the cutters 31 are mounted on the narrow tip portion of finally formed assembly 23, these cutters must be spread apart initially so that they will cut away a segment at the top of pipe 10 sufficient to accommodate the greater width of the upper portion of the body or block. To this end the block is cut part way through and its lower end spread to form the V-shaped notch illustrated in FIG. 1. As the assembly is forced down, the lower halves of the body are forced together and the V-notch is closed as surfaces 36a and 36b are cammed inwardly by sealing surfaces 37a and 37b. Final shape of the body of the assembly is illustrated in FIG. 3. In addition, the cutters 31 may be mounted in such a way that the cutter tips are urged apart to abut the sealing surfaces 37. Then, as the cutters move downwardly, they slide along the sloping sealing surfaces 37, in this way producing a tapered cut and utilizing a shearing/cutting action that is very effective so that the resultant pipe cut is substantially flush with the sealing surfaces. In another alternative form the use of such cutters obviate the need for the V-notch whereby the body of the assembly can be made initially in finished, wedge form.

Whereas the sealing surfaces of a valve are generally made of bronze, it may be desirably, in order to improve the shearing/cutting action, to form the sealing surfaces of a harder material such as stainless steel or the like.

It will also be noted that the pointed configuration of the cutters causes the cutaway section 34 to tend to collapse longitudinally along its upper surface, so that the now collapsed cutaway section 34 is more easily driven downward through the wedge-shaped cutaway area. This action is augmented by making the cutters in pyramidal form as illustrated in FIG. 4.

It will also be noted that during the portion of the stroke in which the cutaway section 34 is being driven downward through the wedge-shaped cutaway area, the cutters 31, being planar, act as shields to cover the sealing surfaces. This prevents the cutaway section 34 from getting caught on the edges of the sealing surface apertures, and prevents the cutaway section 34 from scarring the sealing surfaces.

It should also be noted that when the cutters 31 are mounted in such a way that their tips are urged outwardly, the cutters readily release the cutaway section 34 to deposit it into the retaining recess of the housing. This feature is not essential, however, because the pyramidal cutter shape so distorts the cutout pipe that it is jammed into the retaining recess and stays there when the cutters are retracted.

In general, present day pipes are formed of copper or of plastic. Both of these materials may be cut as described above. However, there may be times when other pipe materials may be used, and these other pipe materials may be harder or more brittle.

DISCUSSION

While the above explanation has been presented in terms of a modified gate valve, it is apparent that the disclosed principles may be used with other types of valves. Moreover, it is also apparent that valves using the disclosed principles to not have to be oriented vertically as assumed above, but may be positioned at other angles, or even inverted. Similarly, the disclosure is not limited to use with water pipes, but is applicable do piping for other fluids and gases. Also, whereas the cutters have been discussed as being about half the pipe diameter in length, the cutters may in certain cases take other configurations.

In the above discussion, it was pointed out that optimal cutting action was obtained when the cutters slid along the sealing surfaces to produce a shearing and cutting action that resulted in a cut that was substantially flush with the sealing surface. Since the housing is split transversely, it may be necessary to split the sealing surfaces into upper and lower halves, and in this case there is a possibility of a slight mismatch at their jointure, so that undesirable high precision manufacturing techniques may be necessary to avoid this mismatch.

SUMMARY

The disclosed control valve has many advantages over prior art devices and systems. First, it permits installation of the control valve in a dry, convenient location. Second, the work area where the control valve is installed remains dry during the installation thus facilitating the installation. Third, the installation of the disclosed control valve is easy, simple, and quick. Fourth, the valve does not have to be removed, but may be left in place. Finally, the control valve proper uses many parts that are standard in the valve art.

I claim:

1. A control valve comprising:
   a valve housing;
   means for affixing said valve housing in an enclosing manner around a portion of a pipe whose flow is to be controlled;
   cutting means for cutting away a section of the pipe enclosed in said valve housing, leaving a cutaway area;
   flow control means for controlling the flow of fluid through said control valve, said flow control means being positioned in said valve housing;
   means for energizing said cutting means for cutting away said section of said enclosed pipe; and
   inserting means for inserting said flow control means into said cutaway area for controlling the fluid flow through said control valve;
   wherein said cutting means comprises a pair of spaced apart non-rotating cutters movable toward each other during the cutting operation, each positioned to cut through said enclosed pipe section substantially flush with a respectively associated sealing surface of the valve housing.

2. The invention defined in claim 1 wherein said sealing surface of said valve housing are tapered and said flow control surfaces of said flow control means are tapered to mate with said tapered sealing surfaces.

3. The invention defined in claim 2 including guide means comprising a ridge positioned on said flow control means, and track means positioned in said valve housing, for guiding the movement of said flow control means longitudinally and against rotation.

4. A control valve comprising:
   a split valve housing having a pair of tapered sealing surfaces;
   means for affixing said valve housing in an enclosing leakproof manner around a portion of a pipe in which fluid flow is to be controlled;
   means for cutting away a section of the pipe enclosed in said valve housing, leaving a cutaway area, said cutting means comprising a pair of spaced apart, V-shaped cutters, each positioned to cut through said enclosed pipe section substantially flush with its associated sealing surface;
   means, positioned in said valve housing, for controlling the flow of fluid through said control valve, said flow control means comprising a wedge having a pair of flow control surfaces that are tapered to mate with said tapered sealing surfaces;
   means for affixing said flow control means and said cutting means to each other such that the spacing between the cutters is diminished when the flow control means is initially energized;
   means for energizing said flow control means for cutting away said section of said enclosed pipe;
   means for inserting said flow control means into said cutaway area with said tapered flow control surfaces in mating orientation with said tapered sealing surfaces for controlling the fluid flow through said control valve.

5. A control valve comprising:
   a transversely split valve housing having,
   a retaining recess,
   an internally threaded sleeve,
   a threaded valve stem engaging the threads of said sleeve, a valve handle affixed to the external end of said valve stem whereby a given rotation of said handle drives the internal end of said valve stem further into said valve housing, and
   a pair of tapered sealing surfaces;
   bolt means for affixing said valve housing in an enclosing leakproof manner around a portion of a pipe whose fluid flow is to be controlled;
   means for cutting away a section of the pipe enclosed in said valve housing, leaving a cutaway area, said cutting means comprising a pair of spaced apart V-shaped and pointed cutters, each cutter oriented to cut through an end of said enclosed pipe section substantially flush with its associated sealing surface;

gate means, positioned in said valve housing for controlling the flow of fluid through said control valve, said flow control gate means comprising a wedge having a pair of flow control surfaces that are tapered to mate with said tapered sealing surfaces;

means for affixing said cutting means to said flow control means;

cutting and inserting means, comprising said valve handle and said valve stem, for driving said cutters through said enclosed pipe section and for inserting said flow control means into said cutaway area with said tapered flow control surfaces in mating orientation with said tapered sealing surfaces for shutting off the fluid flow through said control valve; and means for depositing said cutaway pipe section into said retaining recess of said valve housing;

the combination of the flow control means and the cutters being deformable as an incident to initial action of said cutting and inserting means to diminish the spacing between the cutters and to make the flow control surfaces wedge-shaped in combination.

* * * * *